United States Patent [19]

Schupner

[11] 4,071,122
[45] Jan. 31, 1978

[54] ADJUSTABLE SHOCK ABSORBER

[75] Inventor: Willard J. Schupner, Palatine, Ill.

[73] Assignee: Efdyn Corporation, Chicago, Ill.

[21] Appl. No.: 777,019

[22] Filed: Mar. 14, 1977

Related U.S. Application Data

[63] Continuation of Ser. No. 678,894, April 21, 1976.

[51] Int. Cl.$^2$ .............................................. F16F 9/44
[52] U.S. Cl. ................................... 188/285; 188/287
[58] Field of Search ............... 188/276, 281, 285–287, 188/313, 318

[56] References Cited

U.S. PATENT DOCUMENTS

| 3,344,894 | 10/1967 | Kenworthy | 188/287 |
| 3,478,846 | 11/1969 | Germond | 188/285 |
| 3,510,117 | 5/1970 | Scholin et al. | 188/285 X |
| 3,840,097 | 10/1974 | Holley | 188/287 |
| 3,998,302 | 12/1976 | Schupner | 188/285 |

*Primary Examiner*—Duane A. Reger
*Attorney, Agent, or Firm*—Darbo & Vandenburgh

[57] ABSTRACT

A sleeve is rotatably mounted on the main body and the two define a reservoir cavity therebetween. Projections integral with the body extend radially through the reservoir cavity to contact the inner wall of the sleeve. Spaced axially along the cylinder are a plurality of openings which extend through the projections from the cylinder cavity to the outer end of the projections. On the inner wall of the sleeve in juxtaposition to the outer end of the openings are a plurality of generally annular grooves. The oil path or duct for release of oil from the cylinder cavity to the reservoir cavity when the piston moves inwardly is through the openings and those parts of the grooves at the distal ends of the projections. In one embodiment these grooves vary in cross-sectional size throughout their length. In another embodiment they are helical, at a slight angle to the axis of rotation. Thus as the sleeve is rotated the cross-sectional size of the oil path from the cylinder cavity to the reservoir cavity is varied thereby varying the resistance to flow of the hydraulic fluid.

3 Claims, 6 Drawing Figures

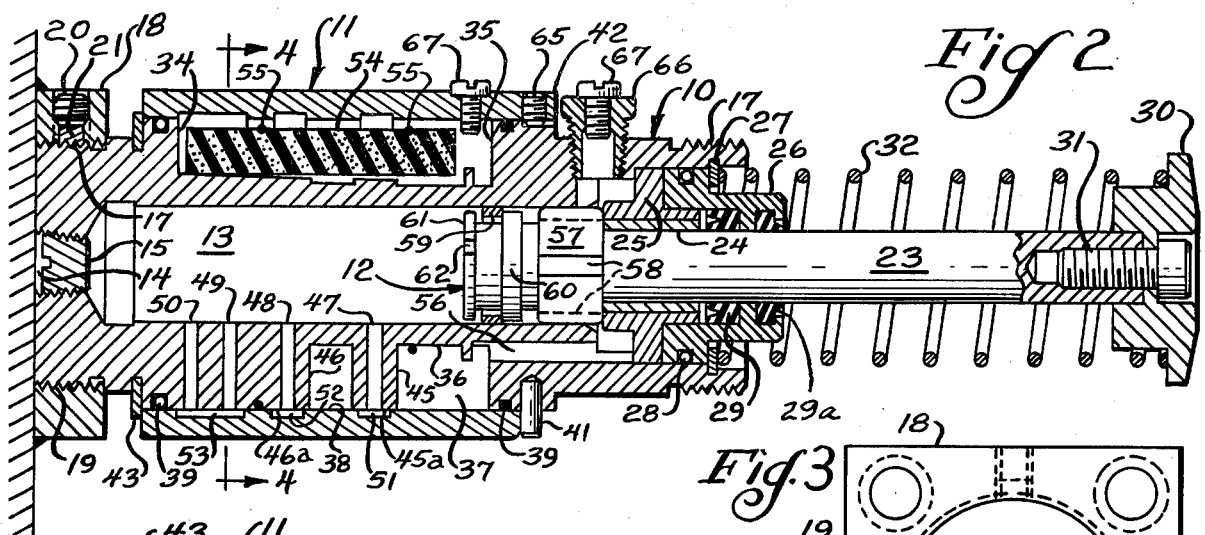
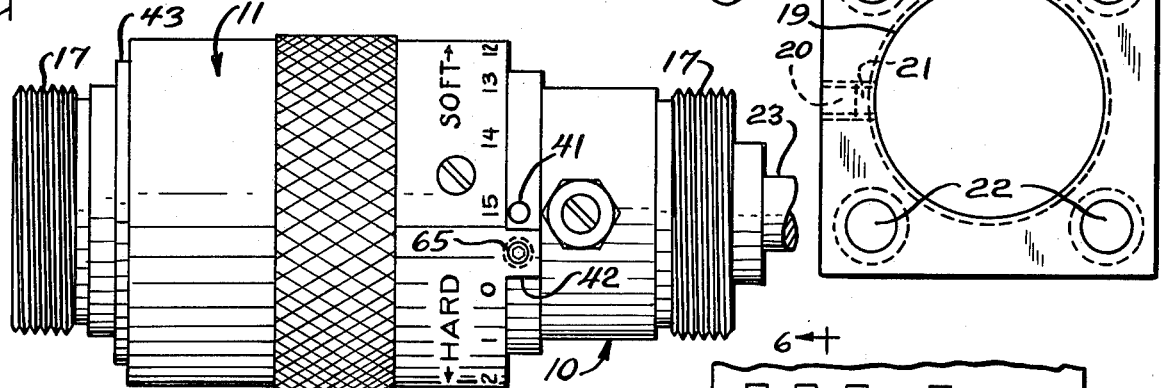
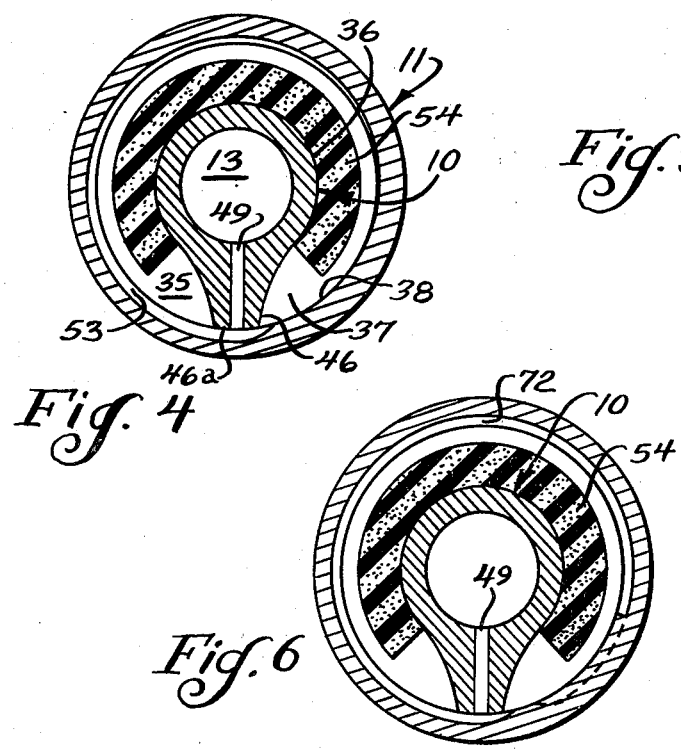
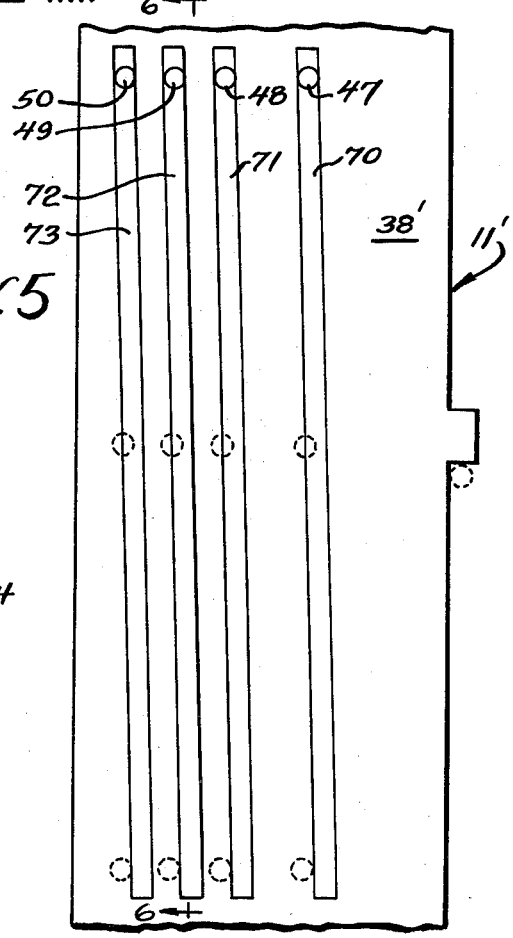

ADJUSTABLE SHOCK ABSORBER

RELATED APPLICATION

This application of my application Ser. No. 678,894, filed Apr. 21, 1976, now abandoned.

BACKGROUND AND SUMMARY OF THE INVENTION

The present invention relates to an adjustable shock absorber (energy absorption device). While the described embodiment is of a type wherein the resistance to flow increases as the piston approaches the bottom of the cylinder by covering up some of the oil flow paths, the invention would be applicable to an embodiment having but a single oil flow path between the cylinder and the reservoir.

The principal object of the invention is to simplify the design of existing shock aborbers of this general type with an attendant advantage of reduction of cost of manufacture. This is accomplished by reason of the fact that embodiments of the invention have essentially only two parts, the main body which defines the hydraulic cylinder and an external sleeve rotatably mounted on that body. The reservoir for the hydraulic fluid expelled from the cylinder as the piston moves towards the bottom of the cylinder is between and defined by the main body and the sleeve. At the same time, the main body and the sleeve cooperate to provide a flow control path between the cylinder and the reservoir, which path can be varied in cross-section as the sleeve is rotated.

The construction is such that the assembly is significantly simplified as compared to present adjustable shock absorbers. The seals are on the exterior of the body where there is little possibility of them becoming damaged or displaced during the course of assembly. Further objects and advantages will be apparent to those skilled in the art from the following description and the appended drawing.

DESCRIPTION OF THE DRAWING

FIG. 1 is an elevational view of an embodiment of the invention;

FIG. 2 is a section longitudinally through the embodiment of FIG. 1;

FIG. 3 is a view of the mounting plate for this embodiment;

FIG. 4 is a transverse section as seen at line 4—4 of FIG. 2;

FIG. 5 is a developed view of the interior of the sleeve of an alternative embodiment; and FIG. 6 is a view similar to FIG. 4, but taken at line 6—6 of the embodiment of FIG. 5.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The embodiment of FIGS. 1-4 comprises a main body, generally 10, a sleeve, generally 11, and a piston, generally 12. The body defines a cylinder cavity 13. This cavity is open at one end to receive piston 12. The other end has a threaded opening 14 which, for example, can be used to connect a pressure gauge, etc., or it can be closed with a pipe plug 15. Also, it may be used as a fill opening for hydraulic fluid.

At each end the body has threads 17 to receive a mounting plate 18. The mounting plate has corresponding internal threades 19. Set screws 20 are used to lock the angular position of the mounting plate on the body. Soft (e.g., Nylon) thread protectors 21 are used under the set screws. The mounting plate may be secured to either end of the body. It is then bolted (using bolt openings 22) or welded to a suitable support.

A piston rod 23 is secured to piston 12. A bearing 24 for the piston rod is held by a bearing support 25. The bearing support abuts the body 11 on one side and a cap 26 on the other side. The cap is held in place by a snap ring 27 seated in a groove in the body. The cap holds an "O" sealing ring 28, an oil seal 29 and a wiper 29a.

A pressure member 30 is secured to the distal end of the piston rod by screw 31. Piston return spring 32 is in compression between snap ring 27 and pressure member 30.

The body includes spaced annular abutments 34 and 35. Between these abutments the outer face 36 of the body is substantially smaller in diameter than is the diameter of the abutments. This provides the space for the reservoir cavity 37 between the outer face 36 and the inner face 38 of the sleeve. The inner face 38 rides on abutments 34 and 35. Sealing rings 39 are used to maintain hydraulic seals therebetween.

A stop pin 41 extends from the body 10 and a projection 42 extends from sleeve 11. This is used to limit the rotation of the sleeve to about 320° about the axis of the cylinder. Pin 41 also will prevent the sleeve from moving axially to the right on the body, as viewed in FIGS. 1 and 2. At the opposite end a snap ring 43 set in a slot in the body prevents the sleeve from moving to the left after assembly.

As seen in FIGS. 2 and 4, two projections 45 and 46 extend in a generally radial direction from the inner wall 36 of the body through the reservoir 37. These projections have distal ends 45a and 46a which contact the inner wall 38 of the sleeve. This could be but a single radial projection, but it is important to decrease the size of the reservoir 37 as little as possible. Openings 47–50 extend through projections 45, 46 in a radial direction. Annular slots 51–53 are formed in the inner wall 38 of the sleeve in alignment with the outer ends of openings 47–50. A duct for oil flow from the cylinder cavity to the reservoir cavity is formed by each opening and the respective slot. As seen in FIG. 4, these slots are graduated in depth throughout their length. At one end the slots have very little depth, while at the other end they are relatively deep. At the limits of rotation of the sleeve, one end or the other is at the outer end of the radial opening in the projection. Except where covered by the distal ends of the projections, the slots are open into the reservoir 37 and in effect form a part thereof. Slot 53 serves both of openings 49, 50, but individual slots for each opening could be employed.

A pad 54 of resilient cellular material is located in reservoir 37. It is held in place by resilient bands 55. The body 11 and bearing support 25 defines a passage 56 to permit fluid communication between the right end of the cylinder cavity 13 and the reservoir cavity 37. The piston bearing 57 has a plurality of slots 58 on the periphery extending in an axial direction to permit the hydraulic fluid to flow past the bearing. The piston of course includes a piston ring 59 to provide a seal when the piston ring is against abutment 60, i.e., when the piston is moving to the left. Abutment 61 has openings 62 therein which are not covered by the piston ring 59 even when the piston ring is against abutment 61. This permits a return flow path for the hydraulic fluid when the piston is moving to the right as seen in the drawing.

When a force to the left is applied to the pressure member 30, this causes the piston 12 to move toward the closed end of the cylinder cavity. At that movement occurs the hydraulic fluid is forced out through openings 47–50. The limitation on the rate of flow of the hydraulic fluid (for any given force) can be adjustably established by the cross-sectional size of those parts of the slots 51–53 positioned at the outer ends of the radial openings. If it is desired to change the resistance to a force, the rate of flow is changed by rotating sleeve 11 to position at which a different cross-sectional slot area exists at the outer ends of the radial openings. As seen in FIG. 1, indicia may be placed on the sleeve for use, in connection with a pointer on the body, to judge the resistance setting. When the desired setting is established set screw 65 in the sleeve 11 is tightened against the body to lock the sleeve in place.

The system may be filled with hydraulic fluid through opening 14 or through the opening closed by plug 66. The latter opening also provides a location for connecting instrumentation. Screws 67 can be removed for bleeding air when the system is filled.

FIGS. 5 and 6 illustrate an alternative embodiment in which the cross-sectional size of the flow path at the outer end of the openings 47-50 is variable in another way. That is, instead of having a circumferential slot which varies in cross-sectional size (as in FIG. 4), the amount of the slot exposed to the radial opening is varied. Thus, the slots 70–73 on the inner face 38' of sleeve 11' are uniform in cross-sectional size throughout their length. However, they are slightly helical about the axis of rotation of the sleeve, i.e., offset only a few degrees from a plane normal to that axis. At one end of the range of rotation of the sleeve, the slots are of a width to expose the full diameter of the opening at the distal ends of the projection. This provides for maximum fluid flow. It is illustrated at the top of FIG. 5. At the other end of the range of rotation, the outer ends of the openings are all but closed by the inner face 38' of the sleeve. This is shown in dotted lines at the bottom of FIG. 5 and provides minimum fluid flow. Intermediate these two limits, more or less of the distal ends of the openings will be exposed by the presence of those parts of the slots that are positioned at those distal ends.

Also, it would be possible to have the sleeve threaded onto the body so that it would shift in an axial direction as the sleeve is rotated and to have grooves 70–73 in planes normal to the axis of rotation. Thus as the sleeve was rotated more or less of the openings would be covered or uncovered, just as in FIG. 5. While such a construction would operate with satisfaction it would not achieve as great a simplification and cost reduction as would the other two embodiments disclosed.

I claim:

1. In an adjustable energy absorber comprising a body member having a cylinder cavity therein formed about an axis, a piston movably mounted in said cylinder cavity, a reservoir cavity and means providing an adjustable flow metering duct from the cylinder cavity to the reservoir cavity, the improvement comprising:

said body having an exterior face generally surrounding said cylinder cavity;

a sleeve surrounding said face and in annular contact with said body in two planes spaced along said axis and transverse thereto, said sleeve being rotatable with respect to the body about an axis generally parallel to said cylinder cavity axis and having an inner face, said inner face being spaced from said exterior face to define said reservoir cavity therebetween;

said means comprising a projection means extending radially through said reservoir cavity from one of said faces to contact the other of said faces with parts of said reservoir circumferentially at each side of said projection means, said projection means being fixed in position with respect to the one face and having an opening therethrough in communication with one of said cavities, said other face being annular about said rotational axis and having a generally circumferential slot therein which is, at at least most positions of rotation of said sleeve, overlapping a part of said projection opening to permit fluid communication between the opening and the slot, said slot being in communication with the other of said cavities whereby communication is established between said cavities through said slot and projection opening and the overlap therebetween to form said duct, and means for varying the cross-sectional size of a part of the duct at said other face in response to the varied rotational position of the sleeve on the body.

2. In an energy absorber as set forth in claim 1, wherein said projection is integral with said body and has a distal end at said inner face, said projection opening extends radially through said body between said cavity and the distal end of said projection, and said other face is said inner face.

3. In an energy absorber as set forth in claim 2, wherein said sleeve is axially immovable with respect to said body.

* * * * *

UNITED STATES PATENT AND TRADEMARK OFFICE
CERTIFICATE OF CORRECTION

PATENT NO. : 4,071,122
DATED : January 31, 1978
INVENTOR(S) : Willard J. Schupner It is certified that error appears in the above-identified patent and that said Letters Patent are hereby corrected as shown below:

Under "Related U. S. Application Data", "1976." should read --1976, abandoned--.
Column 1, line 4, after "application", first occurrence, should be inserted --is a continuation--.
Column 2, line 5, "threades" should read --threads--.
Column 2, line 61, "defines" should read --define--.
Column 3, line 8, "At" should read --As--.
Column 4, line 10, "reservior" should read --reservoir--.

Signed and Sealed this

Sixth Day of June 1978

[SEAL]

Attest:

RUTH C. MASON
Attesting Officer

DONALD W. BANNER
Commissioner of Patents and Trademarks